(12) United States Patent
Burns et al.

(10) Patent No.: US 6,405,315 B1
(45) Date of Patent: *Jun. 11, 2002

(54) DECENTRALIZED REMOTELY ENCRYPTED FILE SYSTEM

(75) Inventors: Randal Chilton Burns; Edward Gustav Chron, both of Sunnyvale; Darrell Long, Soquel; Benjamin Clay Reed, San Jose, all of CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/927,772

(22) Filed: Sep. 11, 1997

(51) Int. Cl.[7] .......................... G06F 11/30; G06F 12/14; H04L 9/32
(52) U.S. Cl. ....................... 713/190; 713/193
(58) Field of Search ................ 380/21, 49, 3, 380/4; 713/201, 190, 193

(56) References Cited

U.S. PATENT DOCUMENTS

| | | | |
|---|---|---|---|
| 5,175,852 A | 12/1992 | Johnson et al. ............. | 395/600 |
| 5,349,643 A | 9/1994 | Cox et al. ..................... | 380/25 |
| 5,475,819 A | 12/1995 | Miller et al. ........... | 395/200.03 |
| 5,490,270 A * | 2/1996 | Devarakonda et al. ...... | 395/600 |
| 5,495,533 A | 2/1996 | Linehan et al. ............... | 380/21 |
| 5,500,897 A | 3/1996 | Hartman, Jr. ................ | 380/25 |
| 5,550,976 A | 8/1996 | Henderson et al. .... | 395/200.06 |
| 5,617,568 A | 4/1997 | Ault et al. ................... | 395/612 |
| 5,638,448 A | 6/1997 | Nguyen ........................ | 380/29 |
| 5,835,601 A * | 11/1998 | Shimbo et al. ............... | 380/49 |
| 5,931,947 A * | 8/1999 | Burns et al. ................. | 713/201 |
| 5,940,507 A * | 8/1999 | Cane et al. .................... | 380/4 |

FOREIGN PATENT DOCUMENTS

JP 08297638 A 11/1996 ............. G06F/1/00

OTHER PUBLICATIONS

Microsoft Computer Press Dictionary Third Edition, Microsoft Press, 1997, p. 154.*

G. Gibson et al., "File Server Scaling with Network–Attached Secure Disks", Proceedings of the ACM International Conference on Measurement and Modeling of Computer Systems (Sigmetrics '97), Seattle, Washington, Jun. 15–18, 1997.

"Network–Attached Secure Disks (NASD)", Computer Science Department, Carnegie Mellon University, Web page, http://www.cs.cmu.edu/Groups/NASD.

H. Krawczyk et al., "HMAC: Keyed–Hashing for Message Authentication", Network Working Group, RFC 2104, HMAC, Informational, Feb. 1997.

* cited by examiner

Primary Examiner—Gail Hayes
Assistant Examiner—Anthony DiLorenzo
(74) Attorney, Agent, or Firm—Khanh Q. Tran; Marc D. McSwain

(57) ABSTRACT

A decentralized file system based on a network of remotely encrypted storage devices is disclosed. The file system includes a network to which a network client, a secure remotely encrypted storage device, a key manager, and a lock manager are attached. The system organizes data as files and directories. Files or directories are composed of one or more streams, which logically partition the data associated with the files or directories. The device serves as a repository of the system's data. The key manager controls data access keys while the lock manager handles consistency of the files. A network user may have read or write access to a file. Access is controlled using keys and access lists maintained by the key manager.

16 Claims, 11 Drawing Sheets

DECENTRALIZED REMOTELY ENCRYPTED FILE SYSTEM

CROSS REFERENCE TO RELATED APPLICATIONS

This application contains materials related to an application for "Secure Array of Remotely Encrypted Storage Devices," by R. Burns et al., U.S. Pat. No. 5,931,947, filed concurrently with this application, commonly assigned, and incorporated by reference herein.

FIELD OF THE INVENTION

The present invention relates generally to distributed data processing. More particularly, the invention relates to a decentralized file system implemented on remotely encrypted data storage devices to provide secure data sharing among clients of the file system.

BACKGROUND OF THE INVENTION

Distributed file systems allow networked computers to access remote storage devices as if the devices were on a local file system. These file systems allow for sharing of data among networked clients. Additionally, a user can access networked data from other networked computers in the same way she accesses it from her own computer. This type of network file sharing is becoming increasingly prevalent as the computing industry becomes more network centric.

FIG. 1 shows a typical prior art distributed file system 1. The system includes several computers 2 and a file server 3 attached to a network 4. The computers 2 (referred to as clients) and server 3 communicate with each other over the network 4 using a network protocol such as Ethernet. A storage unit 5 is attached to the server 3 for storing data accessible to the computers. Each computer 2 might include its own storage unit 6. Typically, a computer 2 would send a request to the server 3 when it need some data stored on the storage unit 5. The server fetches the required data and sends it to the requesting computer. In some cases, data is stored in multiple parts each residing on a different storage unit rather than on a single unit. A distributed file system is then needed to manage the storing, updating, and accessing operations concerning such scattered data.

Distributed file systems have many security problems that local file systems do not have. The network itself is susceptible to security risks such as snooping (unauthorized break-ins), spoofing (impersonation), and packet eavesdropping (unauthorized receipt of data being transmitted over the network). The identity of a network client can be spoofed such as where a user id can be forged in requests to the file server. In addition, the distributed file systems still have the vulnerabilities of the local file systems. The disk containing file data can be stolen and mounted on another machine, bypassing the protection afforded by the operating system. The distributed file server can be broken into giving the attacker root access to the disk. Backup tapes are not generally encrypted and data is easily accessed if they are stolen.

There are three security areas that existing distributed file systems either fail to address, or address inadequately: confidentiality, integrity and authentication. Confidentiality refers to the requirement that the file system data can only be read by the parties that are intended to have access to the data. Integrity means that it is possible for the parties accessing the data to verify that the data read was not altered. Authentication requires that the exchanges between the data repositories and the file system clients are done such that both parties of the exchanges are able to verify the messages involved came from the other.

Network File System (NFS) was an early network file system that has gained wide spread adoption. (See, for example, reference 1). When NFS was introduced, it relied on the operating system to enforce confidentiality, integrity, and authentication. It allowed users to access the network file system as if it were a local file system. Network communications were unencrypted and unauthenticated. The administrators of the local machine could become any user on the machine and gain access to the users files. Other machines on the network could disguise as another machine and fool the NFS server. Since packets were not encrypted across the network, an eavesdropper could view and alter the contents of the packets. Authentication was later added to version 3 of the NFS protocol.

Another file system, the Andrew File System (AFS, reference 2), and its follow-on Decorum File System (DFS, reference 3) are other network file systems that allow users access to the file systems as if they were local file systems. AFS relies on the authorization service Kerberos (reference 4) to authenticate exchanges between the network client and the file system. AFS does not encrypt the file system data. So, an eavesdropper can view the data that is requested or sent to an AFS server. Version 1.2 of DFS added the option of encryption and integrity guarantees (reference 5).

Cryptographic File System (CFS, reference 6) is a file system that acts as a local file system and uses another shadow file system as a repository of data. Each directory of the file system has an encryption key associated that is used to encrypt important meta-data (such as filenames and symbolic links) and file data. CFS uses a modified Data Encryption Standard (reference 7) to perform the encryption. Data is encrypted and then stored in the shadow file system. Each file in CFS has a corresponding file in the shadow file system. Using NFS as the shadow file system allows CFS to act as a network file system. Since the shadow file system is the repository of data, it must provide authentication for changes to the files. If NFS is used as the shadow file system, for example, CFS can be subject to replays (i.e., a copy of the data is presented to pretend that it is coming from the originator).

Accordingly, there is still a need for a decentralized file system based on a network of secure storage devices in which data can be moved, archived, and backed up in a secure manner, files can be securely copied directly from one device to another, and all data encryption is handled by the clients, rather than the devices, to overcome the above-described security problems.

References

1. Sandberg, R., et al., "Design and Implementation of the Sun Network Filesystem," USENIX Conference Proceedings, USENIX Association, Berkeley, Calif., Summer 1985.

2. Howard, J. H. et al., "Scale and Performance in a Distributed File System, ACM Transactions on Computer Systems, Vol. 6, No. 1, February 1988.

3. Kazer, M., et al., "DEcorum File System Architectural Overview", USENIX Summer Conference, June 1990.

4. Steiner, J. G., "Kerberos: An Authentication Service For Open Network Systems," Winter USEIX, 1988, Dallas, Tex.

5. Everhart, C., "Security Enhancements for DCE DFS", OSF RFC 90.0, February 1996.

6. Blaze, M., "A Cryptographic File System for Unix", First ACM Conference on Communications and Computing Security, November 1993.

7. Data Encryption Standard, National Bureau of Standards, Federal Information Processing Standards Publication Number 46, National Technical Information Service, Springfield, Va., Jan. 15, 1977.

SUMMARY OF THE INVENTION

The present invention relates to a decentralized file system based on services provided by a network of secure remotely encrypted storage devices, and methods for securely storing, accessing, and updating data stored in the file system. The file system allows secure movement of data and metadata between the network clients and the network storage devices. Data is accessible only to authorized network clients in possession of appropriate encryption and decryption keys, where all encryption and decryption of data and metadata are performed by the network clients. The storage devices themselves do not have any encryption capabilities. Files can be copied directly from one storage device to another storage device in a secure manner. The network client's only involvement would be to initiate the action.

The basic file system includes a network, a network client that requests data from the system, a secure network storage device serving as a repository of the system's data, a key manager for controlling data access keys, and a lock manager for handling consistency of the files. The key manager maintains an access list of subscribers.

The file structure of the system is hierarchically composed of files and directories. Each directory entry references a file or another directory. Files may be created, read, written, deleted, and truncated. A network user may have read or write access to a file. In addition a user may have lookup access to a directory. Access is controlled using keys and access lists. The access keys and lists are maintained by a key manager which controls the key distribution. Files or directories are composed of one or more streams. Each stream logically partitions the data associated with the respective file or directory, and is physically composed of data objects on the device.

Each network storage device is an independent entity on which the unit of storage is a network object. The devices authorize network access to the network objects using message authentication codes. When a network client wants to update file system data, it reads the network object to be changed, decrypts the data, performs the change, and re-encrypts the data. It then sends a request to the network storage device to replace the old data, and authenticates the request using a change key corresponding to the object.

Each directory entry is a set of stream stripe sets each referring to a group of directory data objects on the storage device. Each directory data object has an encrypted parent reference and multiple entries. These entries contain metadata of a file and encrypted stream locations in the form of a set of stream stripe sets associated with respective byte ranges on the device. If the directory entry refers to another directory, then the stream locations are given as another stream stripe set of the same structure. If the directory entry refers to a file, then each stream stripe set corresponds to a group of file data objects on the device, and includes several stripes each representing a given range of bytes of the stream on the device. Each stripe has a list of the associated file data objects, a stride 65, and a chunk size. The object list points to the data objects in the stream. The stride is the number of bytes that are written to a network object before moving to the next object. A client would need an encryption key and file data object access keys to access the file data objects associated with a file. These keys are managed by the key manager.

Additional objects and advantages of the present invention will be set forth in the description which follows, and in part will be obvious from the description and with the accompanying drawing, or may be learned from the practice of this invention.

DESCRIPTION OF THE PREFERRED EMBODIMENTS

Figure 1:
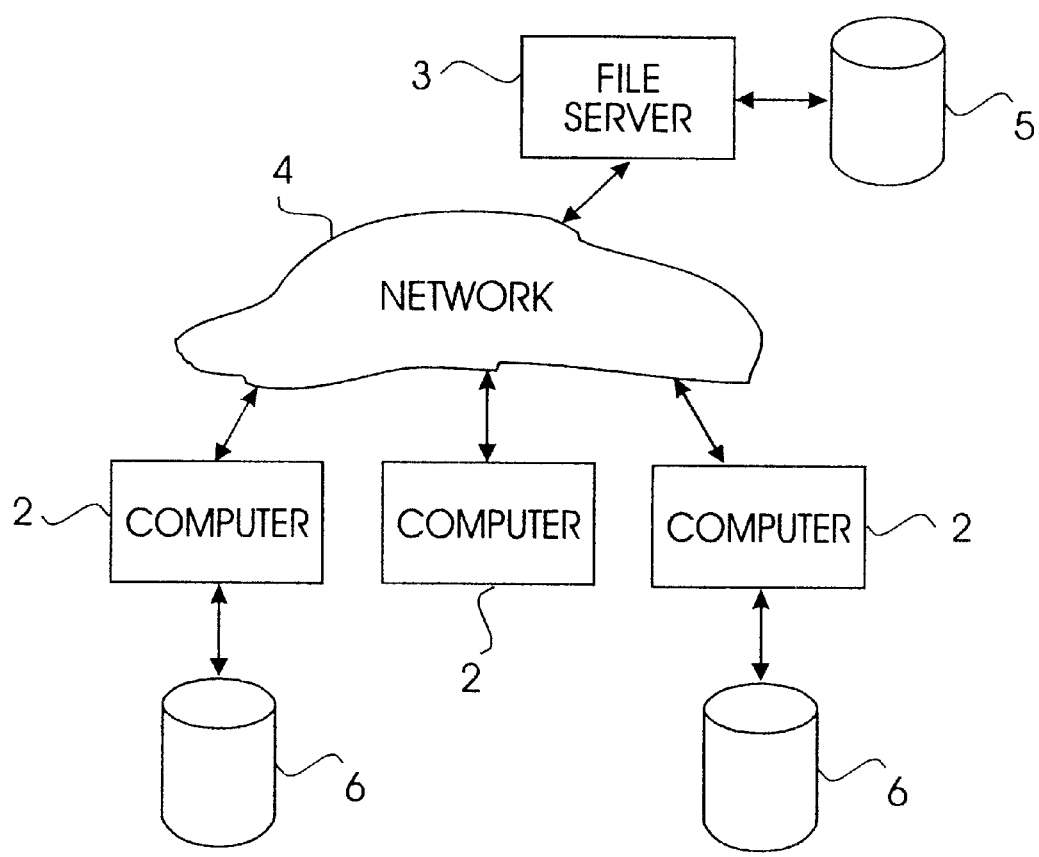
FIG. 1 is a block diagram of a prior art computer network on which the decentralized file system of the invention may be implemented.

The invention will be described in terms of a decentralized remotely encrypted file system implemented on a network of storage devices (e.g., disks) to provide secure access to data in the system, and methods for storing, sharing, updating, and accessing the data. However, persons skilled in the art will recognize that a processor, a storage device, a storage controller, or a distributed computing system, which includes data storage and suitable programming means for operating in accordance with the system and methods to be disclosed, also falls within the spirit and scope of the invention. In addition, the invention may also be embodied in a computer program product, i.e., a computer-readable medium such as a diskette. Such a product may be intended, manufactured, or sold for use with a suitable data processing system. Programming means for directing the data processing system, with which the product is to be used, to execute the steps of the methods of the invention, is written on the recording medium in a form read by the data processing system.

The file system of the present invention builds on services provided by a network of storage devices such as those described in the referenced U.S. Pat. No. 5,931,947. However, other secure storage devices that provide services similar to those described below and in the referenced patent may also be used with the present file system. The network to which the storage devices are attached may be a local area network (LAN) or other network types. The storage devices may be direct-access disk drives (DASDs), optical storage disks, tape drives, computers or instruments that include appropriate means for storing data, or a combination of them.

The devices form a computer system for allowing secure movement of data and metadata between a network client and a network storage device such as in data backup, archive and migration operations. Possession of either a network storage device or a backup of a storage device, file system or file does not permit access to data or metadata. The file system of the present invention allows data files to be copied directly from one storage device to another in a secure manner. The network client's only involvement would be to initiate the copying action. Also, since data is transferred directly between the devices, the overhead to the network client is minimal.

To support the decentralized remotely encrypted file system of the present invention, the storage devices are used as repositories of the file system's encrypted data and metadata. Data is remotely encrypted by the network clients (the components of the file system that request data from the devices), travels over the network in encrypted form, and is stored encrypted on the devices. The advantage of this approach is that data is encrypted or decrypted by the clients as opposed to having the encryption being done at both the devices and the clients. Each network storage device is an independent entity on which the unit of storage is a network object. The devices authorize network access to the network objects using MACs (Message Authentication Code). See, for example, "HMAC: Keyed-hashing for Message Authentication," Krawczyk et al., Request For Comments 2104, February 1997. When a network client wants to update file system data, it reads the network object to be changed, decrypts the data, performs the change, and re-encrypts the data. It then sends a request to the network storage device to replace the old data, and authenticates the request with a MAC done using the change key corresponding to the object.

In the file system of the invention, a network storage device is trusted to store the encrypted file system data (not to send back old or garbage data), but it is not trusted to keep the data secret. Only clients in possession of appropriate encryption and decryption keys can read the data and meta-data of the file system. The network storage devices need not have any encryption capabilities, and backups can be done in such a way as to not compromise the security of the data.

Figure 2:
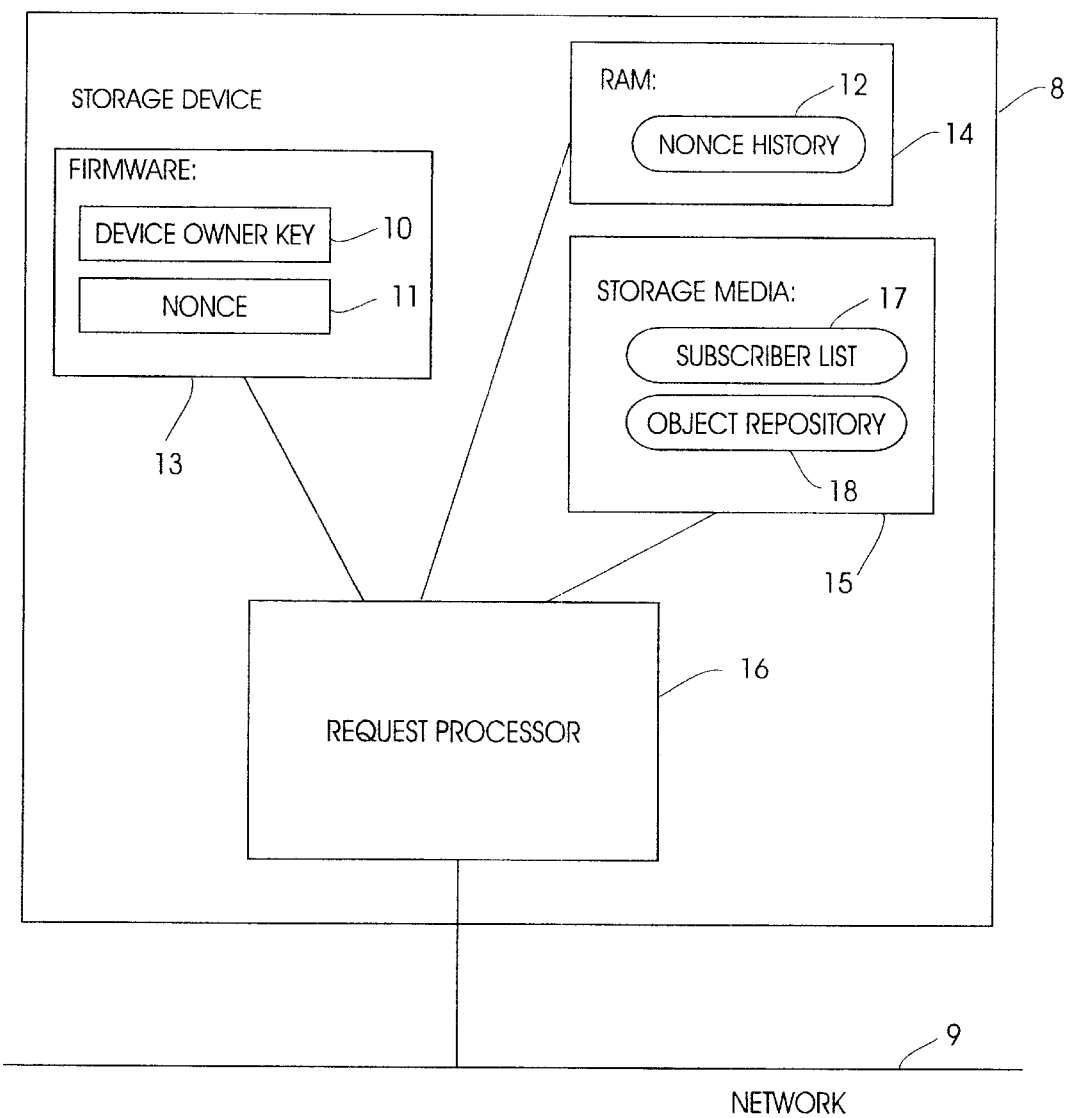
FIG. 2 is a block diagram of a network storage device for use with the decentralized file system of the invention.

FIG. 2 is a block diagram of a typical network storage device 8 for use with the file system of the present invention. The device 8 is one of many similar devices attached to a network 9, along with the network clients (not shown). Each device 8 has a device owner for controlling access to the device's data. The owner sets up subscribers with authority to create objects on the device and preferably includes an owner key 10, a device nonce 11, preferably implemented in firmware 13, and a nonce history 12 preferably implemented in RAM 14. The owner key 10 is used for deriving authentication keys. The device nonce 11 is used for guaranteeing freshness of the requests of the clients. The nonce history 12 has a list of recent nonces and hashed message authentication codes (HMACs) used with the nonces. The owner key 10 and the device nonce 11 are typically provided to a user when the device is acquired.

The device 8 also includes a storage media 15 and a request processor 16. The storage media 15 contains a subscriber list 17 and an object repository 18. The subscriber list 17 includes the ids of the subscribers, while the object repository 18 contains the network objects. Each object will have a unique id that will never be used again on this device even if the object is deleted. Details on the layout of the network objects are described in detail in the referenced patent. The request processor 16 receives requests from the network, services them, and returns responses. The request specifies an object id and a byte range, which the device 8 maps into data sectors on the device. To read or write directory entries, a request is also sent to the device 8, specifying an object id, an entry tag, and a lookup key. In the case of read, the request specifies a range of directory entries.

Figure 3:
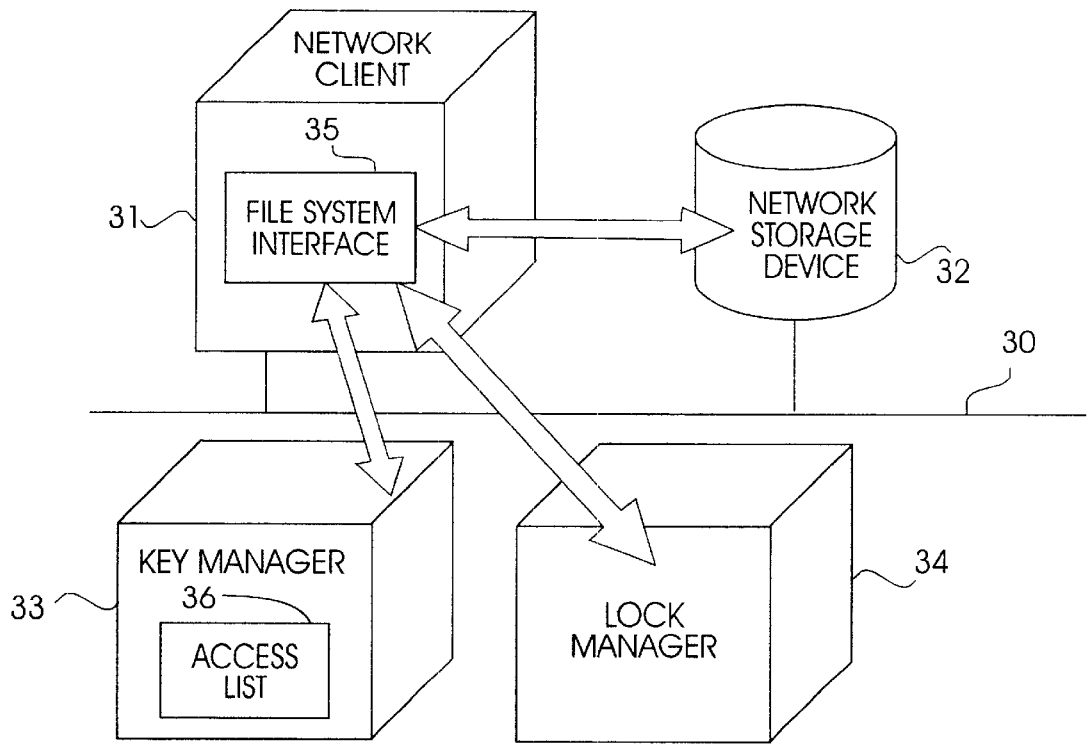
FIG. 3 is a block diagram of the basic components of the decentralized file system of the invention.

Network objects are used to store data on the storage devices. There are two types of network objects: directory data objects and file data objects. File data objects contain all or part of the file data of a file. Directory data objects contain all or part of the directory entries of a directory. Each network object on a device is identified by a unique object id. An object id is not reused even if the corresponding object is deleted. Each object has an object administrator key, which is used to create the lookup, read, extend, delete, and update keys for the object. Both types of network objects use a common object header which includes an identification of the subscriber that created the object FIG. 3 is a block diagram of a basic decentralized file system of the present invention. The system includes a network 30 to which a network client 31, a secure network storage device 32 (similar to the one shown in FIG. 2), a key manager 33, and a lock manager 34 are attached. The client 31 has a file system interface 35 for communicating with the device 32, key manager 33 and lock manager 34 over the network 30, using a network protocol such as Ethernet. The client 31, key manager 33 and lock manager 34 are usually implemented in different computers. The key manager 33 manages the distribution of the keys used to access data on the device 32, as described in more detail below. It maintains an access list 36 of subscribers that may create data objects. The lock manager 34 handles the consistency of the files, as described below.

FILE STRUCTURE

Figure 4:
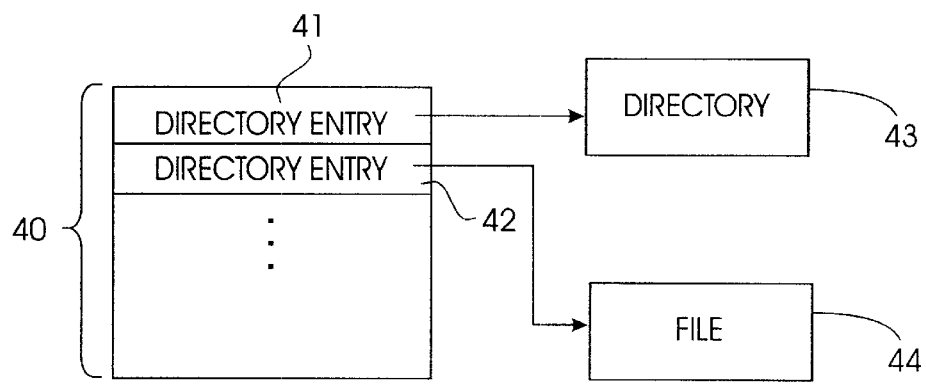
FIG. 4 shows the relationship between files and directories in the decentralized file system of the invention.

In accordance with the invention, the hierarchy of the decentralized remotely encrypted file system consists of files and directories. Each directory entry refers to a file or another directory. FIG. 4 illustrates such a file organization in which entry 41 of a directory 40 points to another directory 43 while entry 42 points to a file 44. The files may be created, read, written, deleted, and truncated. A user may have read or write access to a file. In addition, a user may have lookup access to a directory. Access is controlled using the access keys and access lists maintained by the key manager 33.

Files and directories are made up of one or more streams. Each stream logically partitions the data associated with the respective file or directory, and is physically composed of data objects on the device. For example, an image file can be defined to have three streams. The first stream contains the data for the image. A second stream contains a thumbnail of the image. A third stream contains extended meta data containing a textual description of the image. Each stream corresponds to one or more network objects, where each network object contains data and resides on a network storage device 32. The set of network objects which compose a stream can span multiple network devices 32 in the file system. If the directory entry is for the file, its stream locations will contain references to file data objects. If the directory entry is for another directory, then the first stream will contain references to directory data objects.

Figure 5:
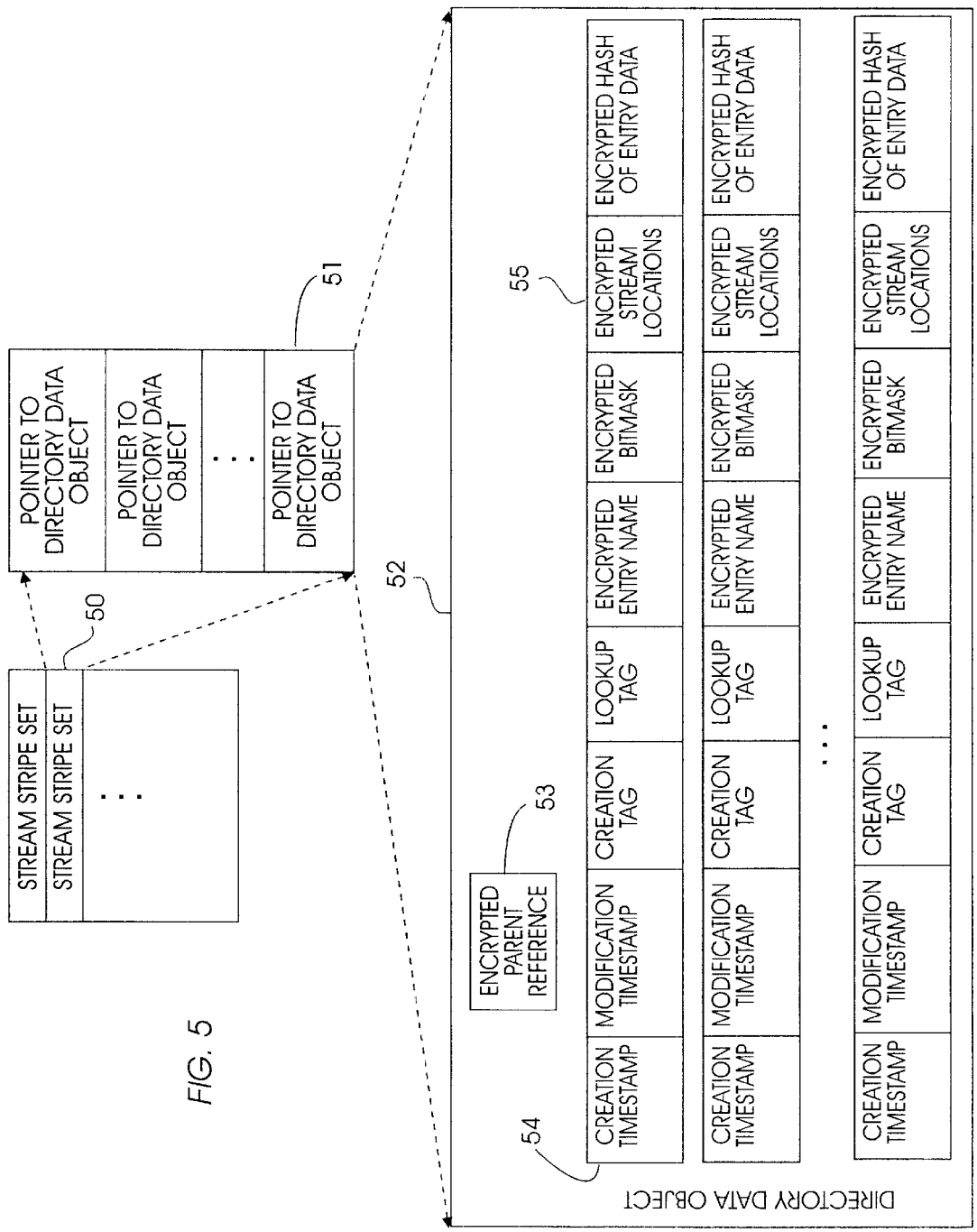
FIG. 5 shows a preferred structure of the directory streams and directory data objects in accordance with the invention.

FIG. 5 shows a preferred embodiment of a directory entry. The directory entry is a set of stream stripe sets 50 where each stream stripe set 50 has pointers 51 that refer to directory data objects 52 on the storage device. Each directory data object 52 includes an encrypted parent reference 53 and multiple entries 54. Each entry 54 contains metadata of a file, which includes, for example, creation and modification timestamps, a creation tag, a lookup tag, an encrypted entry name, an encrypted bitmask, and encrypted stream locations 55. If this directory entry refers to another directory, then the first stream referred to by the stream locations 55 will contain references to other directory objects 52. The stream locations 55 are given as a set of stream stripe sets associated with respective byte ranges on the device. If the directory entry refers to another directory, then the stream stripe set representing the stream locations 55 is the same as the currently described set. If the directory entry refers to a file, then the stream stripe set representing the stream locations 55 is as described below in reference to FIG. 6.

Figure 7:
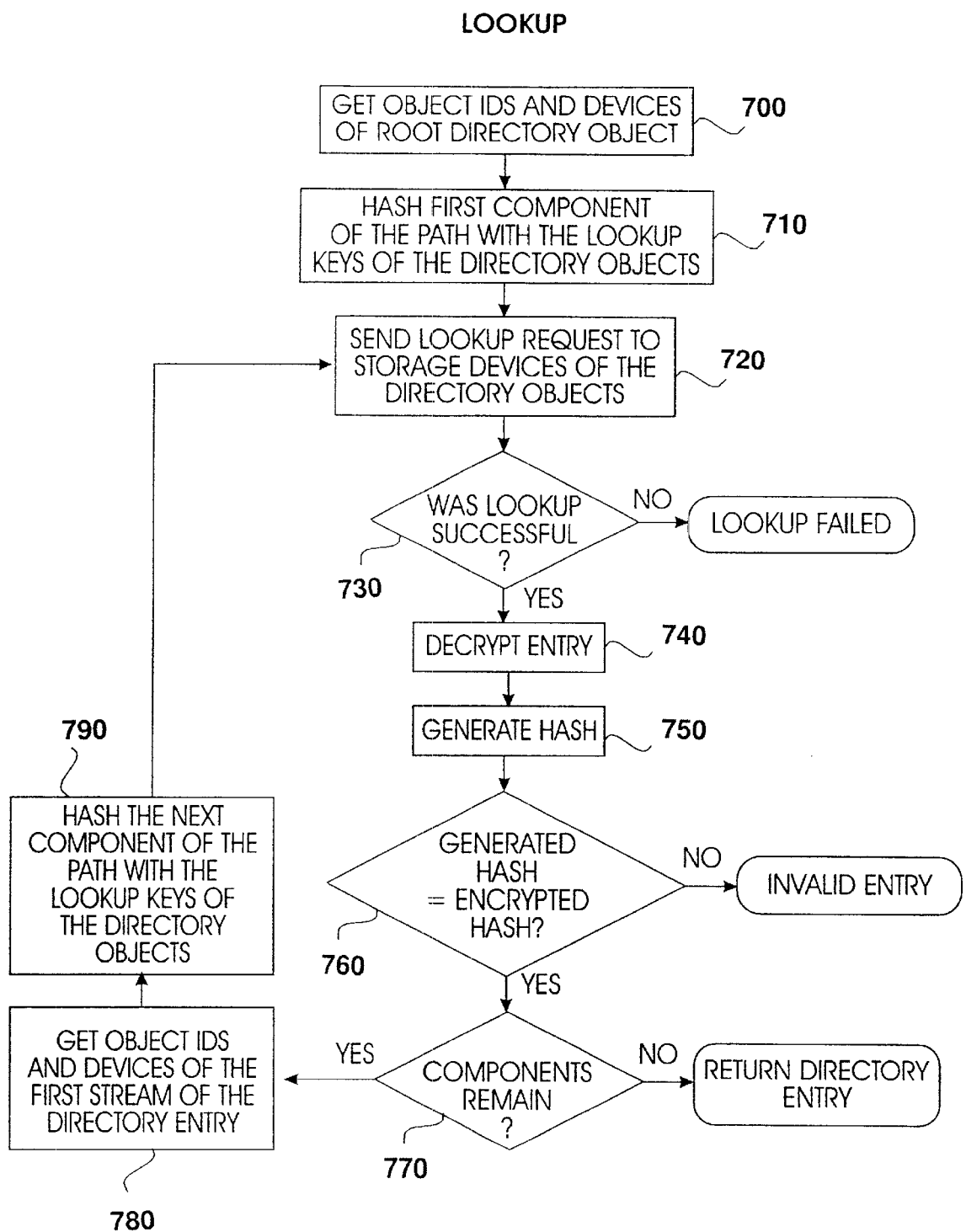
FIG. 7 is a flowchart showing a general sequence for the Lookup operation, for looking up a directory entry in the file system.

The lookup tag is generated by hashing the name of the entry with a lookup key of the directory, for looking up a directory entry (the operation represented by FIG. 7). The entry name is encrypted with a read key of the directory. The lookup and read keys are obtained by the client from the key manager 33. In addition, the client also need directory data object access keys to access the directory data objects 52. The bitmask and stream locations 55 are encrypted using a key generated by hashing the lookup key of the directory, the entry name, and a known salt. A salt is a random data item used to affect the generation of an object access key. The bitmask preferably has two bits: the first bit is set if the entry is for a directory while the second bit is set if the entry is for an executable. Each directory data object 52 stores the encrypted parent reference 53 in its directory information field.

Figure 6:
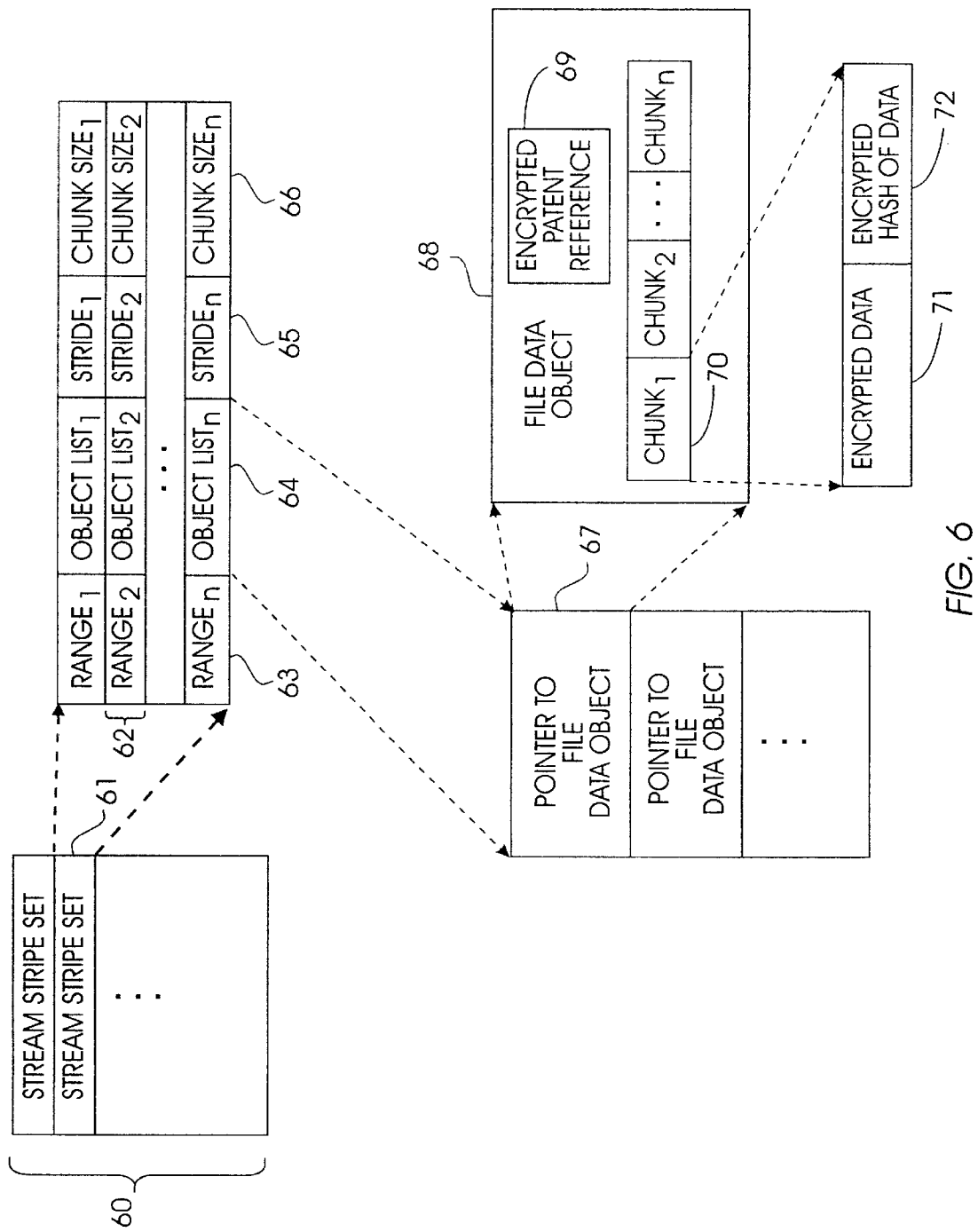
FIG. 6 shows a preferred structure of the file streams and file data objects in accordance with the invention.

FIG. 6 shows a set 60 of stream stripe sets 61 representing the encrypted stream locations 55 (from FIG. 5), where the respective directory entry refers to a file rather than another directory. Each stream stripe set 61 corresponds to several file data objects 68 on the network storage device, and includes several stripes 62 each representing a given range 63 of bytes of the stream on the device. Striping allows a file and directory stream to span a set of network objects. Each stripe 62 also has a list 64 of the associated file data objects 68 and a stride 65. The object list 64 has pointers that reference the data objects in the stream. The stride 65 is the number of bytes that are written to a network object before moving to the next object.

For example, if the stride is 64K and there are three network objects in the stripe, the first network object will contain bytes 0–64K, the second will contain bytes 64K–128K, the third will contain 128K—192K. After 192K, the next 64K will be on the first network object again. There is also a chunk size 66 associated with each stripe 62. If a stream location is presented as a string and an integer instead of a set of stripe sets, the string will be interpreted as a path to a directory entry and the integer as an index into the stream array of the entry. The directory entry and index point to the stripe sets or symbolic link which will be used as the stream location.

Each directory data object 68 includes an encrypted parent reference 69 and multiple chunks 70. Each chunk 70 is made up of file data 71 together with a hash 72 of the data that is then encrypted with an encryption key associated with the stream stripe set 61. The encrypted hash 72 of the data allows detection of corruption or unauthorized changes of the chunks. The chunk size 66 is used by the client to figure out the chunk boundaries to find the encrypted hash 72 for integrity checking of the chunk. The chunks 70 are stored on one or more file data objects. An individual chunk will not span objects. The chunks 70 in the same stream stripe set 61 are all of the same size. The parent reference 69 of the file data object 68 is encrypted with the encryption key of the file that the file data object belongs to. The parent reference 69 contains the network object id, the creation tag, and a stream index of the directory entry that references the file data object 68.

The client will need the encryption key and file data object access keys to access the file data objects 68 associated with the file stream (the file stream stripe set 61) on the network storage devices. The file encryption key is used to encrypt and decrypt the data stored in these file data objects 68. The encryption and access keys are managed by the key manager 33.

KEY MANAGEMENT

The key manager 33 controls the different keys used by the clients in the file system to access the system data. There is a variety of ways to handle key distribution. For example, the necessary keys for a file or directory may be encrypted with a public key of a user and stored in the second stream of the file or directory. Alternatively, the users may maintain a wallet of keys used to accesses objects, or a trusted key management server may be used. Because of the decentralized nature of the file system of the invention, it is hard to revoke access to a file or directory. To revoke access, new keys must be generated and distributed, and the file or directory must be re-encrypted. As an illustration, key management using a trusted key management server is now described.

The management server maintains two tables: a table of network object ids, the keys associated with them, and a table of network objects ids, users, and access rights. Communication between network clients and the key management server is encrypted and authenticated using the Transport Layer Security (TLS) or Kerberos protocols. The TLS protocol is described in "The TLS Protocol," Version 1.0 by T. Dierks et al., May 21, 1997, and Kerberos is described in reference 4. When a user needs access to a network object, a request for the keys to the object is initiated. The server would check the access list for the user's access and returns the appropriate keys.

BACKUP

The data in the decentralized file system is backed up by backing up the storage devices that make up the file system. The network storage devices preferably includes a backup key. Possession of the backup key allows the objects of the device to be enumerated and then read. An entire disk can then be dumped to tape. To restore a file, the objects that make up that file are located by their network object id.

LOCK MANAGER

Locking and cache consistency will be handled by a distributed lock manager 34. The lock manager 34 handles the consistency of files on the level of network objects. Before a network client can change a network object, it must request a write lock from the lock manager. (Note: the network object itself doesn't handle any locking). Each lock requested has a lease associated with it. The lock becomes invalid when the lease expires, the client explicitly releases it, or the lock manager contacts the client to revoke the lock. When a client is contacted to revoke a lock, it must flush any pending changes for the locked region and then release the lock. When a client requests a read lock, the lock manager revokes any write locks held on the region before granting the read lock. When a client requests a write lock, the lock manager revokes any read and write locks held on the region before granting the lock. Note, for a file that is being read and written by multiple clients this method of locking will yield poor performance; however, studies have show that this access pattern occurs rarely in distributed file systems.

FILE SYSTEM PROTOCOL

The following section outlines a preferred embodiment of the operations that can be used to implement a Virtual File System (VFS) based on the above-described file system. VFS is used by UNIX to add file systems to a base operating system. The outlined operations are lookup, create, truncate, read, write, get attribute, set attribute, lock, make directory, remove directory, remove file, rename, and create symbolic link.

File System Operations

1. Alter Object Size (Grow or Shrink Object)

This operation adjusts the size of the designated directory or file object. The size specified may be used to increase or decrease the amount of space occupied by the object.
Parameters:
Network Object attributes returned from lookup,
Whether to grow or shrink the object,
Amount to grow of shrink object,
Place to store object attributes (null if not required)
Credentials used to validate access permission.

2. Create Directory Object

This operations creates a new directory object in the designated Parent directory.
Parameters:
Network Object attributes returned from lookup for the Parent directory,
Name of the new directory,
Mode of the new directory,
Place to store the object id for the new object,
Credentials used to validate access permission.

3. Create File Object

Creates a new file object with the specified name in the designated Parent directory.
Parameters:
Network Object attributes returned from lookup for the Parent directory,
Name of the object being created,
Mode of the object being created,
Place to store the object id for the new object,
Credentials used to validate access permission.

4. Create Symbolic Link Object

This operation creates a new file object that is a symbolic link in the designated Parent directory.
Parameters:
Network Object attributes returned from lookup for the Parent directory,
Name of the symbolic link being created,
The relative path to the object being linked,
Mode of the symbolic link,
Place to store the object id for the new object,
Credentials used to validate access permission.

5. Lock (and Unlock)

This operation obtains or returns either a shared or exclusive lock on specified file for a specified byte range.
Parameters:
Network Object attributes returned from lookup,
Whether the request is a lock or unlock request,
Offset and range to be locked or unlocked,
Specify the type of lock being requested: Share (Read) or Exclusive (Update),
Indication of whether to wait for the lock or return immediately if lock isn't available,
Credentials used to validate access permission.

6. Lookup (and Return Directory Entry)

This operation locates the specified object in the specified Parent directory and returns the object's attributes and the object's directory entry if found. The operation is represented by the flowchart of FIG. 7. In step 700, the lookup operation gets object IDs and devices of the root directory object. In step 710, the first component of the path is hashed with the lookup keys of the directory objects. In step 720, the lookup operation sends a lookup request to storage devices of the directory objects. Next, in step 730, if the lookup was successful, the lookup operation proceeds to step 740 and decrypts the entry; otherwise lookup failed and the lookup operation ends. In step 750, the lookup operation generates hash. In step 760, if generated hash is equivalent to encrypted has, the lookup operation proceeds to step 770; otherwise the entry is invalid and the lookup operation ends. In step 770, if components remain, the lookup operation proceeds to step 780 to get object IDs and devices of the first stream of the directory entry; otherwise the lookup operation returns the directory entry. In step 790, the lookup operation hashes the next component of the path with the lookup keys of the directory objects and then proceeds to step 720.
Parameters:
Network Object attributes returned from lookup for the parent directory,
Name of the object being sought,
Place to store object attributes,
Place to store directory entry for object,
Credentials used to validate access permission.

7. Read

This operation reads data starting from one or more specified locations from the designated network object, for the specified lengths and places the results in the designated locations. It returns the number of bytes actually read from each location. The request can optionally return the updated attributes for the object's directory entry and or any of the targeted network objects. The operational sequences for reading a file and a directory are represented by the flowchart of FIGS. 11 and 12, respectively.

Figure 11:
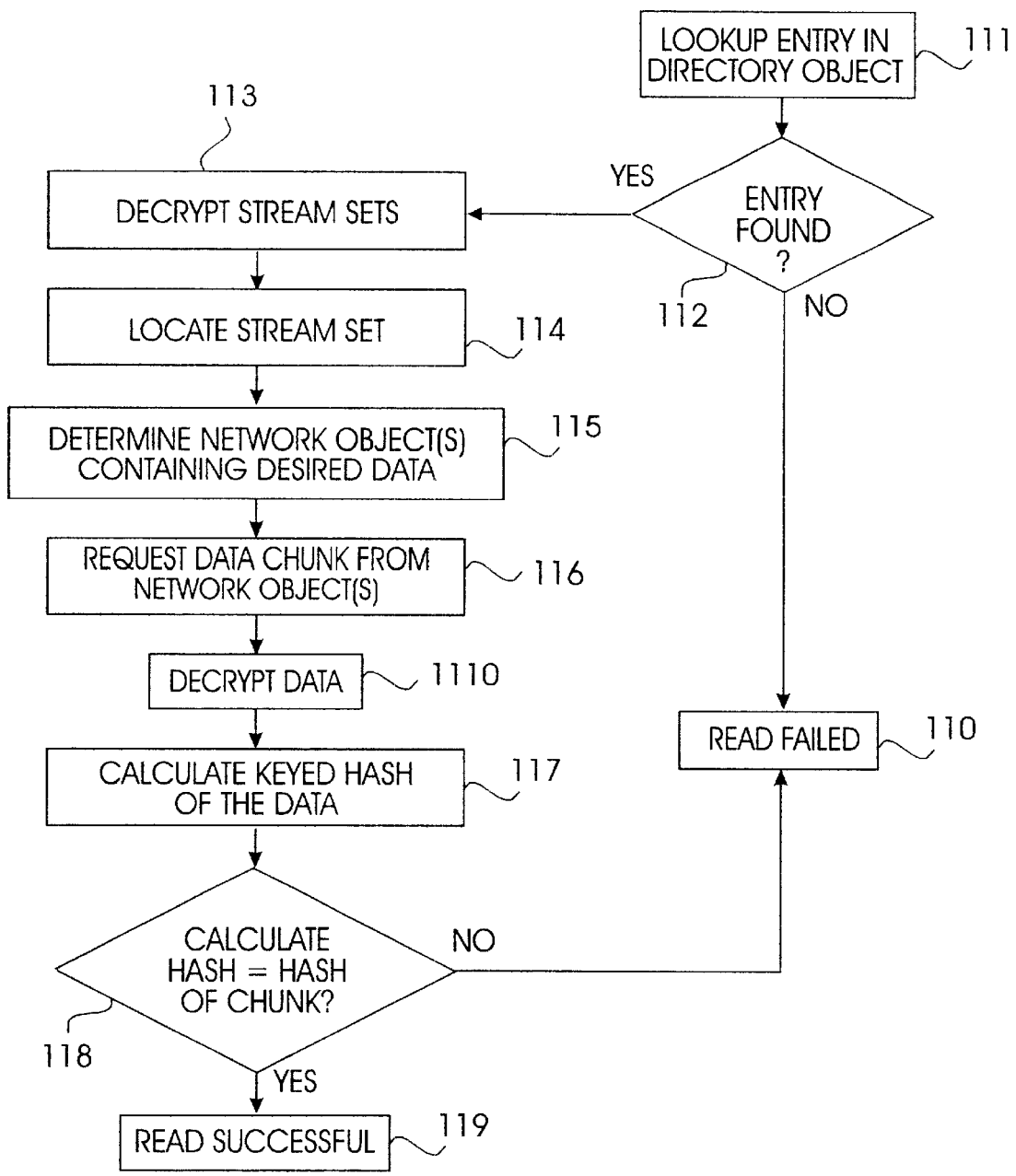
FIG. 11 is a flowchart showing a general sequence for the File Read operation, for reading a file from the decentralized file system.

Referring now to FIG. 11, in step 111 the file read operation calls the 'lookup' operation for the entry in the directory object. In step 112, if the entry is found, then the file read operation proceeds to step 113 to decrypt stream sets; otherwise the file read operation failed and ends in step 110. In step 114, the file read operation locates the stream set. Next, in step 115, the file read operation determines network object(s) containing desired data. Then, in step 116, the file read operation requests a data chunk from network object(s). In step 1110, the file read operation decrypts data. Next, in step 117, the file read operation calculates keyed hash of the data. In step 119, if the calculated has equals the hash of the chunk, the file read operation was successful and ends in step 119; otherwise, the file read operation failed and ends in step 110.

Figure 12:
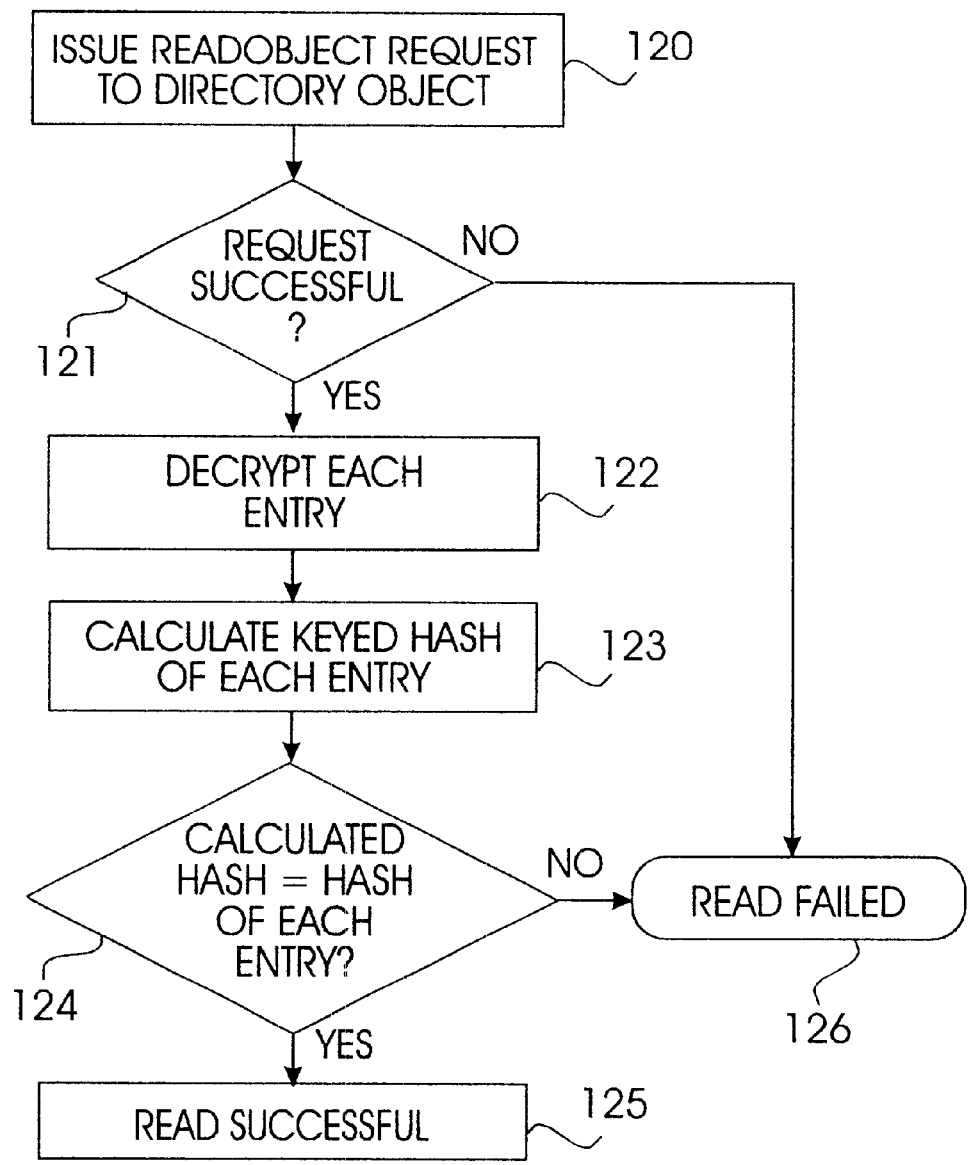
FIG. 12 is a flowchart showing a general sequence for the Directory Read operation, for reading a directory from the file system.

Referring now to FIG. 12, in step 120, the directory read operation issues a read object request to the directory object. In step 121, if the read object request was successful, the directory read operation proceeds to step 122 to decrypt each entry; otherwise, the directory read operation failed and ends in step 126. In step 123, the directory read operation calculates the keyed hash of each entry. In step 124, if the calculated hash equals the hash of each entry, the directory read operation succeeded and proceeds to end in step 125; otherwise, the directory read operation failed and ends in step 126.

Parameters:
Network Object attributes returned from lookup,
Place to store entry's attributes (null if not required),
Number of entries in the following array,
Array of one or more entries which specify:
  Byte offset into the file to start reading from,
  Number of bytes to read,
  Location to store the bytes that are read,
  Place to store the count of how many bytes were actually read,
  Place to store object attributes (null if not required)
Credentials used to validate access permission.

8. Remove Directory or File Object

These operations remove a designated file or directory object. The flowchart in FIG. 8 represents a sequence for removing a file object, while the flowchart in FIG. 9 represents a sequence for removing a directory object.

Figure 8:
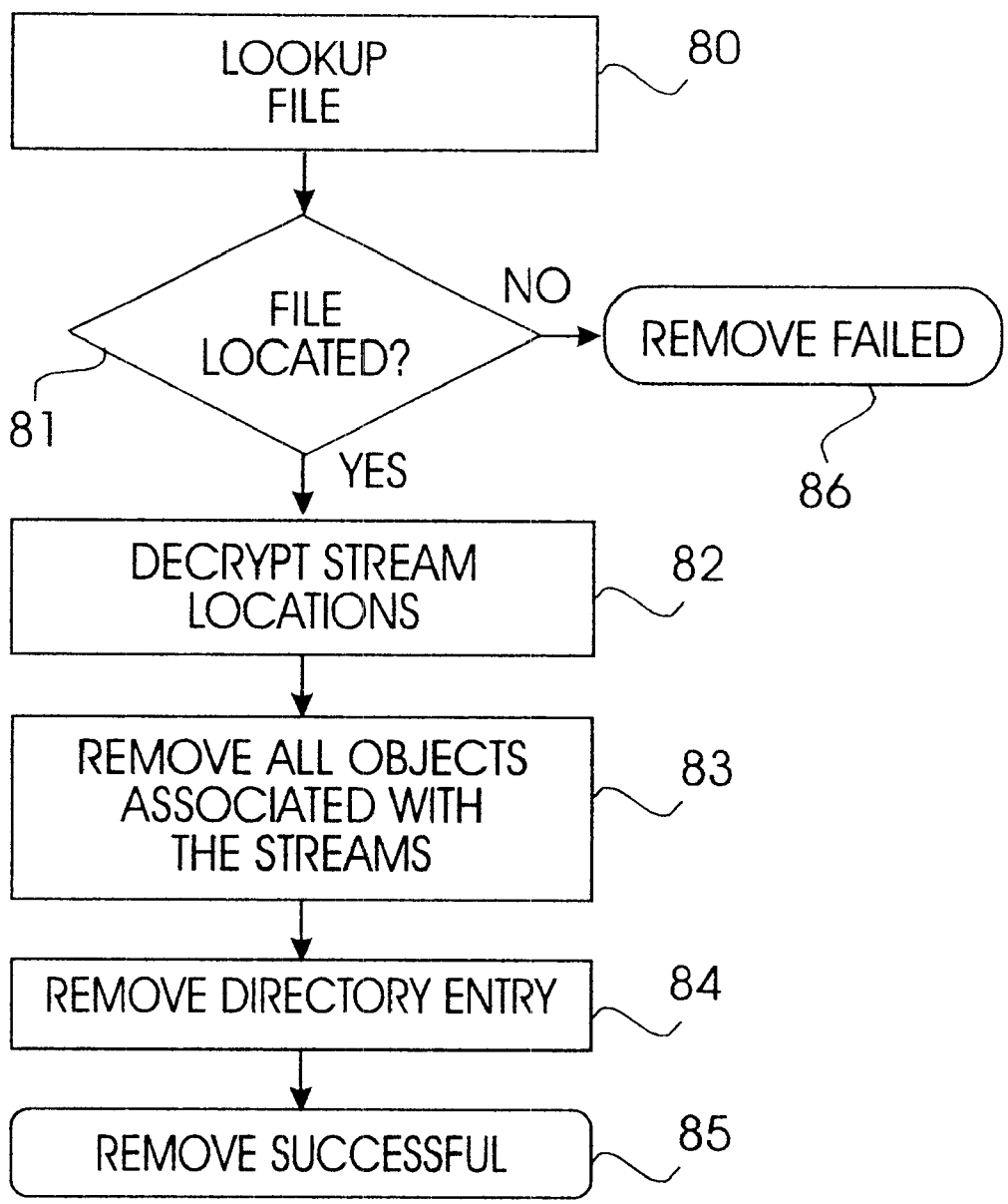
FIG. 8 is a flowchart showing a general sequence for the Remove File operation, for removing a file from a device in the file system.

Referring now to FIG. 8, in step 80, the remove file operation calls the 'lookup' operation to locate the file. In step 81, if the file was located, the remove file operation proceeds to step 82 to decrypt stream locations; otherwise the remove file operation failed and ends in step 86. In step 83, the remove file operation removes all objects associated with the streams. Next, in step 84, the remove file operation removes the directory entry. Finally, in step 85, the remove file operation was successful, and ends.

Figure 9:
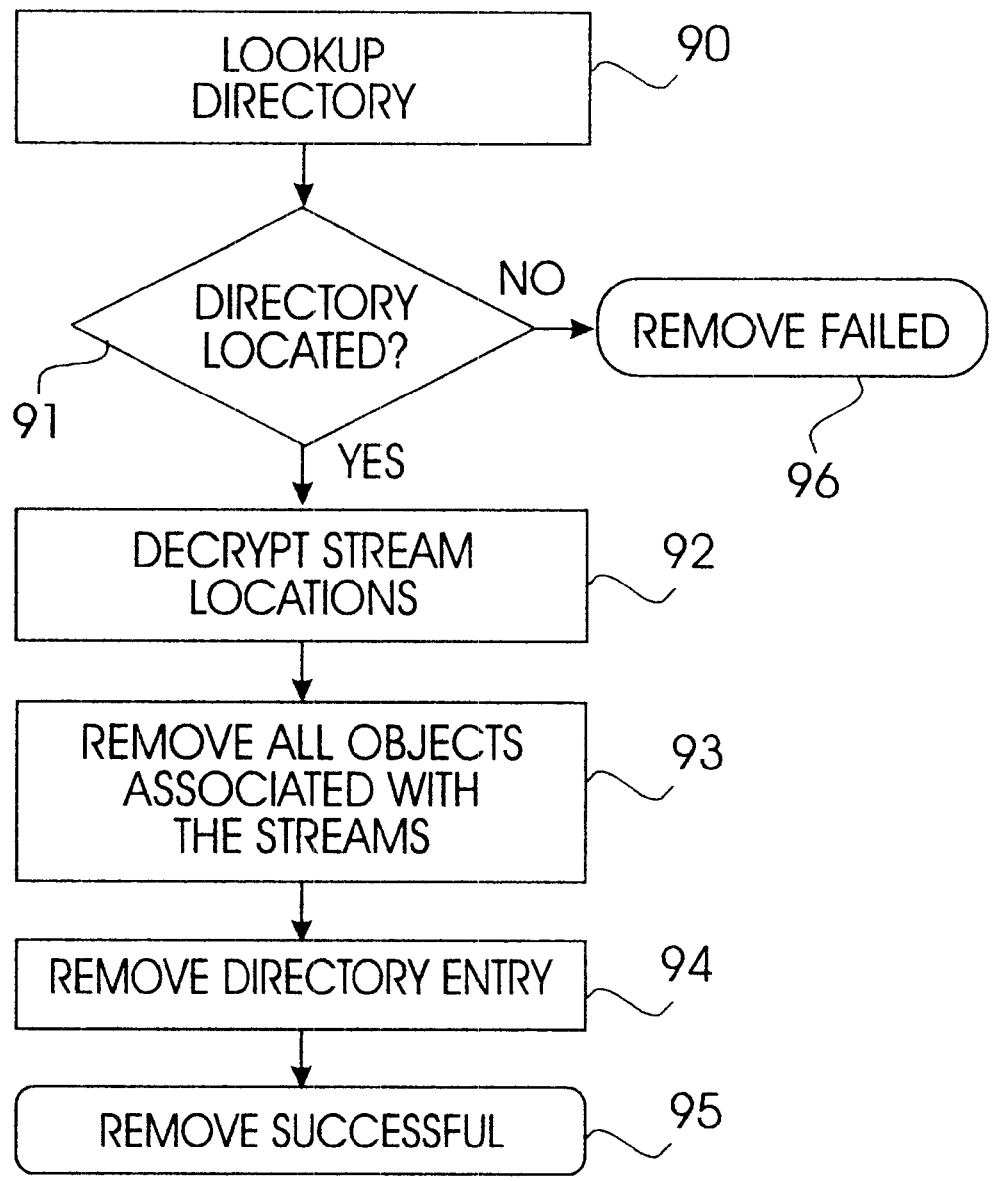
FIG. 9 is a flowchart showing a general sequence for the Remove Directory operation, for removing a directory from a device in the file system.

Referring now to FIG. 9, in step 90, the remove directory operation calls the 'lookup' operation to lookup the directory. In step 91, if the directory was located, the remove directory operation proceeds to step 92 to decrypt stream locations; otherwise the remove directory operation failed and ends in step 96. In step 93, the remove directory operation removes all objects associated with the streams. Next, in step 94, the remove directory operation removes the directory entry. Finally, in step 95, the remove directory operation ends successfully.

Parameters:
Network Object attributes returned from lookup,
Credentials used to validate access permission.

9. Rename Object

Figure 10:
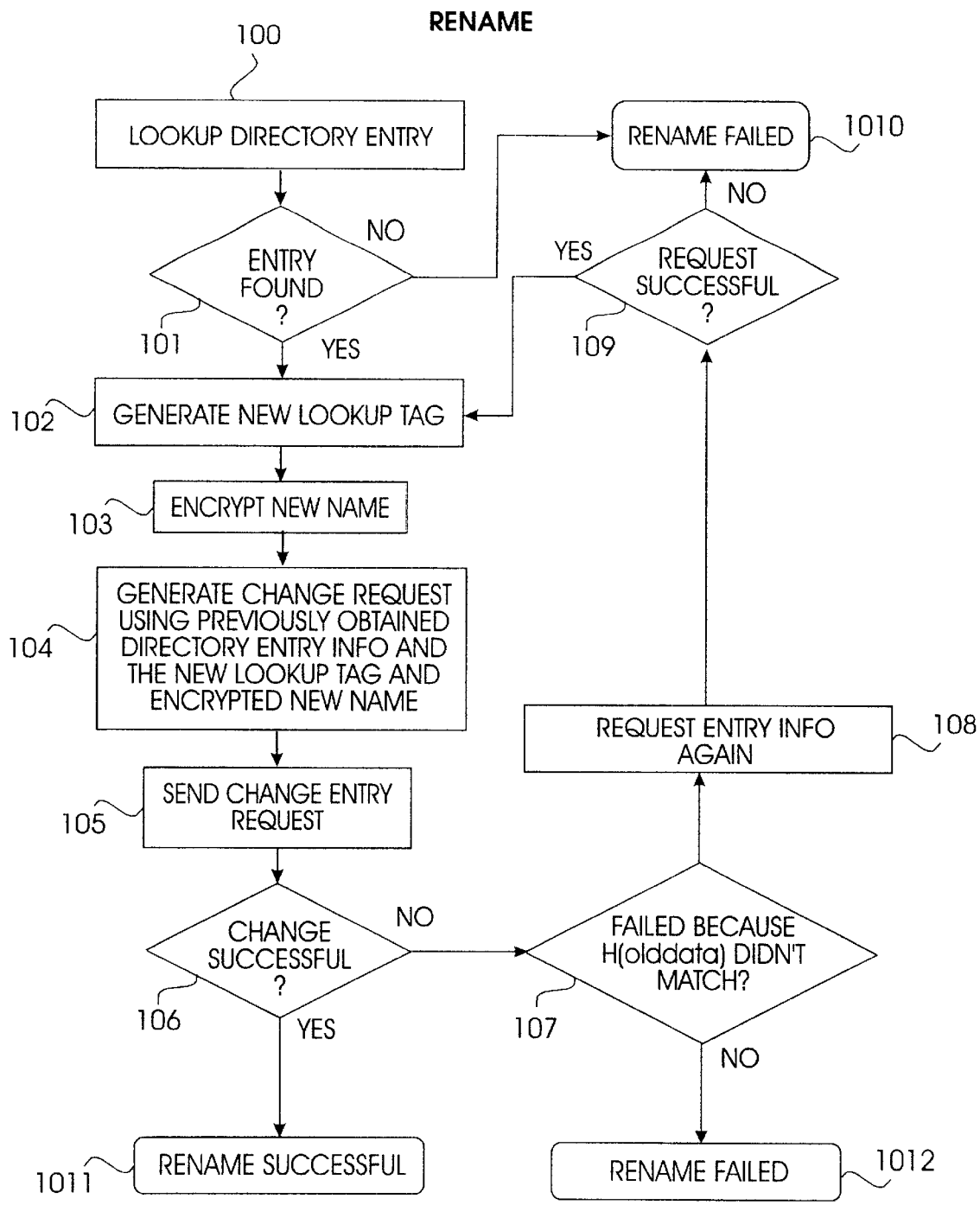
FIG. 10 is a flowchart showing a general sequence for the Rename operation, for renaming an object on a device in the file system.

This operation renames the designated directory or file object to the specified name and is represented by the flowchart of FIG. 10.

In step 100, the rename operation calls the 'lookup' operation to locate the directory entry. In step 101, if the entry was found, the rename operation proceeds to step 102 to generate the new lookup tag; otherwise the rename operation failed, and ends in step 1010. In step 103, the rename operation encrypts the new name. Next, in step 104, the rename operation generates a change request using previously obtained directory entry info and the new lookup tag and encrypted new name. In step 105, the rename operation sends a change entry request. In step 106, if the change was successful, the rename operation was successful, and ends in step 1011; otherwise, the rename operation proceeds to step 107. In step 107, if the change failed because H(olddata) didn't match, the rename operation proceeds to step 108 to request entry information again; otherwise the rename operation failed and ends in step 1012. In step 109, if the entry information request was successful, the rename operation proceeds to step 102 to generate a new lookup tag; otherwise the rename operation failed, and ends in step 1010.

Parameters:
Network Object attributes returned from lookup,
New name of the object,
Credentials used to validate access permission.

10. Set Object Attributes

This operation sets the attributes for the designated directory or file object.

Parameters:
Network Object attributes returned from lookup,
Values of Attributes to replace existing values,
Credentials used to validate access permission.

11. Write

This operation write data starting from one or more specified locations to the designated network object(s), at the specified offsets for the specified lengths. The information to write is supplied in designated locations. Return the number of bytes actually written at each location. The request can optionally return the updated attributes for the object's directory entry and or any of the targeted network objects.

Parameters:
Network Object attributes returned from lookup,
Place to store entry's attributes (null if not required),
Number of entries in the following array,
Array of one or more entries which specify:
Byte offset into the file to start writing to,
Number of bytes to write,
Location to store the bytes that are to be written,
Place to store the count of how many bytes were actually written,
Place to store object attributes (null if not required)
Credentials used to validate access permission.

Details on Selected File Operation Parameters

1. File Attributes:
Owner's user id,
Owner's group id,
Device where object is located,
Object id for object,
Object type (regular, directory, symbolic link),
Number of links to object, (will always be one since hard links aren't supported),
Size of object in bytes,
Number of blocks that the occupied by the object (needed for sparse objects),
Last access timestamp,
Last data modification timestamp, Last status change timestamp, Mode: read, write, execute (lookup) permissions for owner, group, other users etc., Access control list.

2. Mode:

Set User ID on execution, Set Group ID on execution,

Owner's: read, write, execute (lookup) permissions,

Group's: read, write, execute (lookup) permissions (stored but ignored),

Other User's: read, write, execute (lookup) permissions (stored but ignored).

3. Object Statistics:

Identification of the type of file system,

Whether file system is local or remote,

Object type (regular, directory, symbolic link)

Owner's user id,

Owner's group id,

Device where object is located,

Object id for object,

Number of links to object, (will always be one since hard links aren't supported), Size of object in bytes, Number of blocks that the file occupies (needed for sparse objects), Last access timestamp, Last data modification timestamp, Last status change timestamp, Mode: read, write, execute (lookup) permissions for owner, group, other users etc., Access control list.

Thus, for the system to revoke access to an object (file or directory) on a device, the object must be re-encrypted by a client.

While several preferred embodiments of the invention have been described, it should be apparent that modifications and adaptations to those embodiments may occur to persons skilled in the art without departing from the scope and the spirit of the present invention as set forth in the following claims.

What is claimed is:

1. A distributed file system for use with a network of storage devices, each device having means for storing data as remotely encrypted data objects including encrypted metadata describing a directory structure in said distributed file system, means for authenticating data requests and responses, and means for determining freshness of the requests, the system comprising:

at least one client that each performs file management tasks and can remotely encrypt and decrypt the data objects using a plurality of keys;

a key manager for controlling the keys used by the client to access the data objects; and a lock manager for maintaining data consistency when the client accesses the data objects, wherein files and metadata may be copied directly from one storage device to another storage device in a secure manner, and only said clients possessing appropriate encryption and decryption keys have access to data stored in said storage devices.

2. The distributed file system of claim 1, wherein said storage devices replace old stored data with new data upon request of said client.

3. The distributed file system of claim 1, wherein said file management tasks include maintaining a logical mapping of locations of files and directory entries stored on said network of storage devices.

4. The distributed file system of claim 3, wherein said files and directory entries comprise one or more streams logically partitioning data into said data objects.

5. The distributed file system of claim 4, wherein each said directory entry is stored as a set of stream stripe sets each referring to a group of directory data objects on said storage devices, with each directory data object containing an encrypted parent reference, file metadata, and encrypted stream locations in terms of byte ranges on said storage devices.

6. The distributed file system of claim 5, wherein if said directory entry refers to another directory then the stream locations are given as another stream stripe set of the same structure, and if said directory entry refers to a file then each stream stripe set corresponds to a group of file data objects on said storage devices and includes several stripes each representing a given range of bytes of the stream on one or more of said storage devices.

7. The distributed file system of claim 6, wherein each of said stripes includes a list of associated file data objects, a stride describing the number of bytes written to a particular network object before moving to a next network object, and a chunk size describing the number of bytes subject to encryption at a time.

8. The distributed file system of claim 7, wherein each chunk includes a combination of file data together with a hash of the data, with the combination then encrypted with an encryption key associated with the stream stripe set.

9. A method for storing data as remotely encrypted data objects on a network of storage devices in a distributed file system, comprising the steps of:

requesting data from said storage devices using at least one client;

authenticating data requests and responses using a plurality of keys, controlling said keys using a key manager;

accessing data using at least one client to perform file management tasks; and maintaining data consistency using a lock manager, wherein files and metadata may be copied directly from one storage device to another storage device in a secure manner, and only said clients possessing appropriate encryption and decryption keys have access to data stored in said storage devices, and said remotely encrypted data objects include encrypted metadata describing a directory structure in said distributed file system.

10. The method of claim 9, wherein said storage devices replace old stored data with new data upon request of said client.

11. The method of claim 9, wherein said file management tasks include maintaining a logical mapping of locations of files and directory entries stored on said network of storage devices.

12. The method of claim 11, wherein said files and directory entries comprise one or more streams logically partitioning data into said data objects.

13. The method of claim 12, wherein each said directory entry is stored as a set of stream stripe sets each referring to a group of directory data objects on said storage devices, with each directory data object containing an encrypted parent reference, file metadata, and encrypted stream locations in terms of byte ranges on said storage devices.

14. The method of claim 13, wherein if said directory entry refers to another directory then the stream locations are given as another stream stripe set of the same structure, and if said directory entry refers to a file then each stream stripe set corresponds to a group of file data objects on said storage devices and includes several stripes each representing a given range of bytes of the stream on one or more of said storage devices.

15. The method of claim 14, wherein each of said stripes includes a list of associated file data objects, a stride describing the number of bytes written to a particular network object before moving to a next network object, and a chunk size describing the number of bytes subject to encryption at a time.

16. The method of claim 15, wherein each chunk includes a combination of file data together with a hash of the data, with the combination then encrypted with an encryption key associated with the stream stripe set.

\* \* \* \* \*